Sept. 16, 1941.   H. C. ROBBINS ET AL   2,255,813
STEERING WHEEL
Filed Oct. 3, 1940
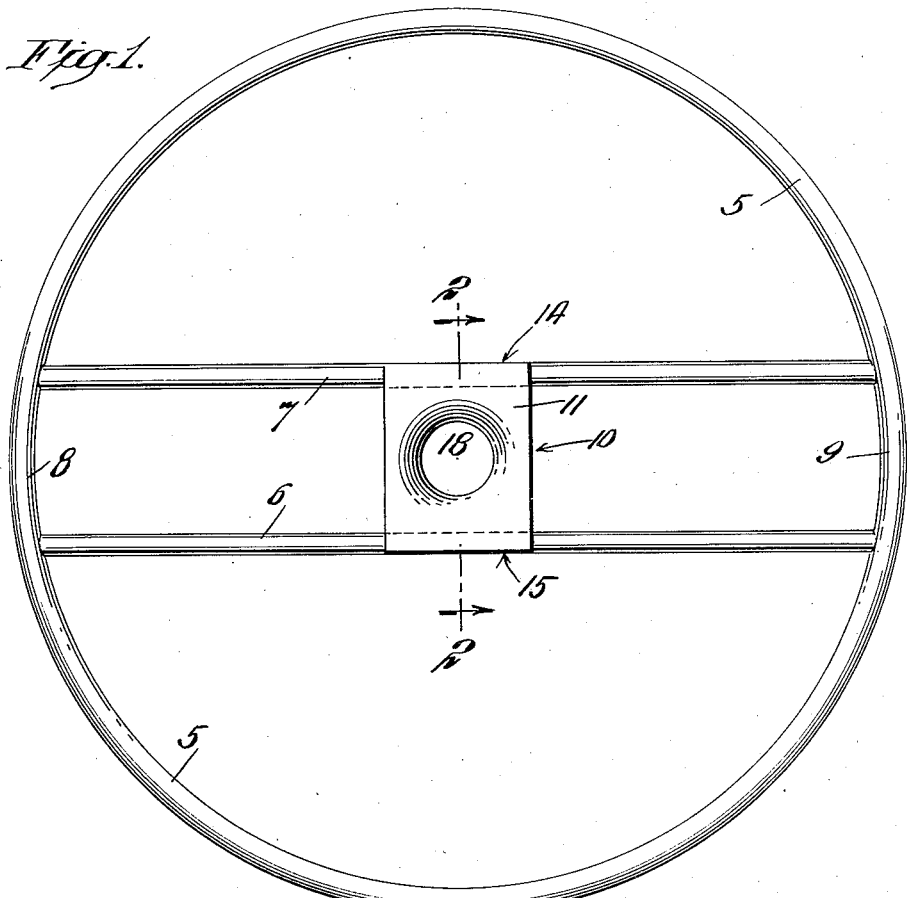
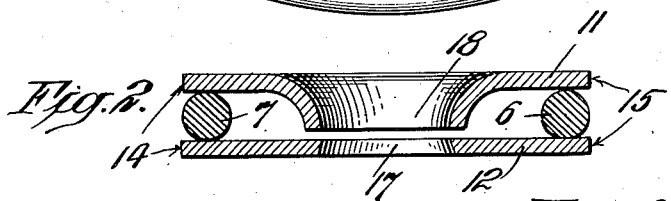
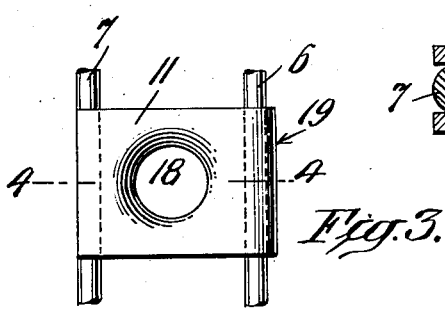
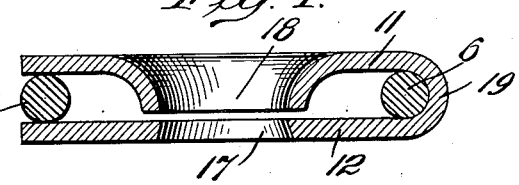
INVENTORS
HERBERT C. ROBBINS
CARL F. HILLDRING
BY
English Studwell
ATTORNEYS Patented Sept. 16, 1941

2,255,813

UNITED STATES PATENT OFFICE 2,255,813

STEERING WHEEL

Herbert C. Robbins and Carl F. Hilldring, Akron, Ohio, assignors to American Hard Rubber Company, New York, N. Y., a corporation of New York Application October 3, 1940, Serial No. 359,472

2 Claims. (Cl. 74—552)

The present invention relates to an improvement in steering wheels and more particularly to an improved hub structure for steering wheels.

Steering wheel hubs, especially those adapted for service on automotive vehicles, are generally die cast or machined from steel bar stock. In either case, the production of the hub is relatively expensive and there is also an excess of material to cover assembled or welded points.

The object of the invention is to provide a steering wheel hub composed of a minimum of material but sufficiently strong for its intended purpose, and which can be produced much more cheaply than cast or machined hubs can be produced. To this end the invention consists in the improved hub for steering wheels fully described hereinafter and particularly pointed out in the appended claims.

In the accompanying drawing illustrating the invention, Fig. 1 is a top plan view of the improved steering wheel provided with one form of hub; Fig. 2 is a transverse section, on an enlarged scale, taken on the line 2—2 of Fig. 1; Fig. 3 is a top plan view of a modified form of hub; and Fig. 4 is a transverse section, on an enlarged scale, taken on the line 4—4 of Fig. 3.

The improved steering wheel comprises a circular grip member or rim 5 which may be formed from wire bent on itself, two straight spokes 6 and 7, lying in substantially the same plane, which may be wire rods extending parallel with each other from the inner surface of one side 8 of the rim 5 to the inner surface of the other side 9 of the rim, and a hub generally indicated at 10 in Fig. 1. The hub 10 comprises an upper plate 11 of sheet metal about one-eighth of an inch thick, and a lower plate 12, the plates being preferably of rectangular outline, and embracing the middle portions of the spoke rods 6 and 7 between their outer straight ends 14 and 15, as shown in Fig. 2, and to which they are securely fastened, by soldering or brazing. The upper and lower hub plates 11 and 12 are centrally pierced with a hole for receiving the upper end of the steering post. The hole 17 in the lower plate 12 is tapered to fit the steering post, whereas the hole 18 in the upper plate 11 is formed by broaching or punching, the lower section of the hole 18 being of substantially the same diameter as the smaller diameter of the hole 17 in the lower plate 12 and the upper section of the hole 18 being flared outwardly, as best seen in Fig. 2.

In the modified form of the invention shown in Figs. 3 and 4, the arrangement of the members is exactly the same as in the form of the invention shown in Figs 1 and 2, and accordingly the corresponding parts are given the same reference numerals. The only difference between the two forms of the invention is that in Figs. 1 and 2 the two hub plates 11 and 12 are separate pieces, whereas in Figs. 3 and 4 the hub plates 11 and 12 are formed from a single strip of metal bent into U-shape and are connected at the bend 19.

It will be recognized that the improved steering wheel described above provides several advantages over former constructions. In the first place there is no excess material. In the second place the required machine operations are of the simplest, the parts being produced by stamping and punching, except the finishing of the tapered hole 17 in the lower plate 12, which is done by reaming. In the third place, this form of hub is especially adapted for use in steering wheels provided with at least two parallelly-arranged spokes extending from one side of the rim of the wheel to the other side. In the usual present form of hub made from round or cylindrical stock, it is necessary to bend the middle portions of the spokes to fit around the sides of the round hub, or else another member is required, welded to the hub and to the spokes. The hub of the present invention eliminates these expensive operations. Moreover, with this novel hub the over all height of the hub structure is reduced.

Having thus described the invention what we claim as new is:

1. A steering wheel comprising a circular rim, two spokes in substantially the same plane extending from one side of the circular rim to the opposite side and being spaced apart at their middle point, and a hub consisting of a U-shaped member formed from a flat plate, the inner surface of one arm of the U being secured to one side of the two spokes and the inner surface of the other arm of the U being secured to the other side of the two spokes, the two arms of the U having alined holes adapted to fit over a steering post.

2. A steering wheel comprising a circular rim, a plurality of spokes extending inwardly from the rim and across the center of the wheel, the portions of at least two of said spokes at the center of the wheel being in substantially the same plane, and a hub consisting of a U-shaped member formed from a flat plate, the inner surface of one arm of the U being secured to one side of said two spokes and the inner surface and the other arm of the U being secured to the other side of said two spokes, the two arms of the U-shaped member having alined holes adapted to fit over a steering post.

HERBERT C. ROBBINS.
CARL F. HILLDRING.